(12) United States Patent
Lee

(10) Patent No.: US 9,599,820 B2
(45) Date of Patent: Mar. 21, 2017

(54) ELECTRONIC DEVICE AND METHOD OF OPERATING AN ELECTRONIC DEVICE

(71) Applicant: SAMSUNG DISPLAY CO., LTD., Yongin, Gyeonggi-Do (KR)

(72) Inventor: Kwang-Hoon Lee, Anyang-si (KR)

(73) Assignee: SAMSUNG DISPLAY CO., LTD., Yongin, Gyeonggi-Do (KR)

( * ) Notice: Subject to any disclaimer, the term of this patent is extended or adjusted under 35 U.S.C. 154(b) by 0 days.

(21) Appl. No.: 14/519,415

(22) Filed: Oct. 21, 2014

(65) Prior Publication Data

US 2015/0185476 A1  Jul. 2, 2015

(30) Foreign Application Priority Data

Dec. 30, 2013 (KR) .................. 10-2013-0166504

(51) Int. Cl.
| | |
|---|---|
| *G02B 27/01* | (2006.01) |
| *G01L 1/14* | (2006.01) |
| *G06K 9/00* | (2006.01) |
| *G01L 1/18* | (2006.01) |
| *G01L 1/22* | (2006.01) |
| *G01B 7/16* | (2006.01) |

(52) U.S. Cl.
CPC ............ *G02B 27/017* (2013.01); *G01L 1/142* (2013.01); *G01L 1/18* (2013.01); *G01L 1/22* (2013.01); *G06K 9/00885* (2013.01); *G01B 7/18* (2013.01); *G02B 2027/014* (2013.01); *G02B 2027/0178* (2013.01); *G09G 2358/00* (2013.01)

(58) Field of Classification Search
None
See application file for complete search history.

(56) References Cited

U.S. PATENT DOCUMENTS

| | | | |
|---|---|---|---|
| 7,123,215 B2 | 10/2006 | Nakada | |
| 8,184,067 B1 | 5/2012 | Braun et al. | |
| 8,223,024 B1 | 7/2012 | Petrou | |
| 8,235,529 B1 | 8/2012 | Raffle et al. | |
| 8,368,794 B2 | 2/2013 | Sako et al. | |
| 2005/0057339 A1* | 3/2005 | Ikehara | G06F 3/03543 340/5.52 |
| 2006/0132315 A1* | 6/2006 | Kurtz | G06F 21/32 340/573.1 |
| 2009/0158856 A1* | 6/2009 | Harish | G01L 1/142 73/780 |
| 2010/0110368 A1* | 5/2010 | Chaum | G02B 27/017 351/158 |
| 2010/0248822 A1* | 9/2010 | Migos | A63F 13/06 463/29 |

(Continued)

FOREIGN PATENT DOCUMENTS

| | | |
|---|---|---|
| JP | 2004-236101 | 8/2004 |
| JP | 2011-086049 | 4/2011 |

(Continued)

*Primary Examiner* — Kenneth Bukowski
(74) *Attorney, Agent, or Firm* — Lee & Morse P.C.

(57) ABSTRACT

An electronic device includes a frame to be worn by a user, at least one strain gauge coupled to the frame, and a control unit. The at least one strain gauge generates a deformation measurement signal indicative of an amount of strain caused by deformation of the frame. The control unit identifies the user wearing the frame based on the deformation measurement signal.

19 Claims, 8 Drawing Sheets

(56) References Cited

U.S. PATENT DOCUMENTS

| | | |
|---|---|---|
| 2011/0267321 A1 | 11/2011 | Hayakawa |
| 2012/0167124 A1* | 6/2012 | Abdeljaoued .......... H04H 60/45 |
| | | 725/11 |
| 2013/0069787 A1 | 3/2013 | Petrou |
| 2013/0169683 A1 | 7/2013 | Perez et al. |
| 2014/0062841 A1* | 3/2014 | Ishikawa ............ G02B 27/0176 |
| | | 345/8 |
| 2014/0064500 A1* | 3/2014 | Lee ...................... H04R 1/1041 |
| | | 381/58 |
| 2014/0150571 A1* | 6/2014 | Kuniyoshi .............. G01L 1/205 |
| | | 73/862.625 |

FOREIGN PATENT DOCUMENTS

| | | |
|---|---|---|
| JP | 2011-242591 | 12/2011 |
| JP | 2013-037021 | 2/2013 |
| KR | 10-0244764 B1 | 11/1999 |

* cited by examiner

ELECTRONIC DEVICE AND METHOD OF OPERATING AN ELECTRONIC DEVICE

CROSS REFERENCE TO RELATED APPLICATION

Korean Patent Application No. 10-2013-0166504, filed on Dec. 30, 2013, and entitled, "Electronic Device and Method of Operating an Electronic Device," is incorporated by reference herein in its entirety.

BACKGROUND

1. Field

One or more embodiments described herein relate to an electronic device and a method of operating the electronic device.

2. Description of the Related Art

A smart device is readily portable because of its small size. These smart devices are held by hand during use. To obviate this inconvenience, a wearable smart device (e.g., a watch) has been developed to provide improved portability and convenience. Also, a head mounted device in the form of glasses has been developed. Because a wearable smart device can be worn by any person, a security problem arises such as invasion of privacy.

SUMMARY

In accordance with one embodiment, an electronic device includes a frame configured to be worn by a user, at least one strain gauge coupled to the frame, the at least one strain gauge configured to generate a deformation measurement signal indicative of an amount of strain caused by deformation of the frame, and a control unit configured to identify the user wearing the frame based on the deformation measurement signal. The frame may be configured to be worn on a head of the user, and the electronic device may be a head-mounted device (HMD).

The electronic device may include a display device configured to display a result of the identification by the control unit. The at least one strain gauge may include an electrode formed in substantially a zigzag shape on the frame, and the at least one strain gauge may generate the deformation measurement signal based on a change in resistance of the electrode caused by deformation of the frame.

The at least one strain gauge may have a semiconductor layer on the frame, and the at least one strain gauge may generate the deformation measurement signal based on a change in resistance of the semiconductor layer caused by deformation of the frame.

The at least one strain gauge may include a first electrode in a comb shape on the frame; and a second electrode in the comb shape on the frame, wherein the first and second electrodes are substantially symmetrical with each other, and wherein the at least one strain gauge is to generate the deformation measurement signal based on a change in capacitance between the first and second electrodes cause by deformation of the frame.

The electronic device may include a memory configured to store at least one value of the deformation measurement signal corresponding to at least one authorized user, wherein the control unit may identify the user wearing the frame by comparing a value of the deformation measurement signal currently generated by the at least one strain gauge with the value of the deformation measurement signal stored in the memory.

The control unit may begin to identify the user wearing the frame when a change in the amount of the deformation measurement signal is maintained below a first reference value for a predetermined time. After the control unit identifies the user wearing the frame, the control unit may re-identify a wearer when a change in the amount of the deformation measurement signal exceeds a second reference value.

When the frame is deformed in a predetermined deformation pattern, the at least one strain gauge may generate the deformation measurement signal indicating the predetermined deformation pattern, and the control unit may identify the user based on the predetermined deformation pattern indicated by the deformation measurement signal.

The frame may have a shape of glasses. The frame may include two rims, two lenses fixed to respective ones of the rims, a bridge to connect the rims, legs connected to respective ones of the rims, and a nose pad to support the rims, wherein the at least one strain gauge may be located on at least one of the rims, bridge, legs, or nose pad.

In accordance with another embodiment, a method of operating an electronic device including a wearable frame includes receiving at least one deformation measurement signal from a strain gauge located at the frame, the at least one deformation measurement signal indicative of an amount of strain caused by deformation of the frame; and identifying a user wearing the frame based on the at least one deformation measurement signal. The frame may be configured to be worn on a head of the user, and the electronic device may be a head-mounted device.

The method may include displaying a result of the identification of the user. The method may include storing at least one value of the deformation measurement signal corresponding to at least one authorized user, wherein identifying the user may include comparing a value of the at least one deformation measurement signal currently generated by the strain gauge with the at least one value of the deformation measurement signal stored in the memory.

Identifying the user may begin when a change in amount of the at least one deformation measurement signal is maintained below a first reference value for a predetermined time. After the user wearing the frame is identified, a wearer of the frame may be re-identified when the change in the amount of the at least one deformation measurement signal exceeds a second reference value.

When the frame is deformed in a predetermined deformation pattern, the strain gauge may generate the deformation measurement signal indicating the predetermined deformation pattern, and identifying the user wearing the frame may include identifying the user based on the predetermined deformation pattern indicated by the at least one deformation measurement signal.

The frame may include two rims; two lenses fixed to respective ones of the rims; a bridge connecting the rims; two legs connected to respective ones of the rims; and a nose pad configured to support the rims, wherein the strain gauge is located on at least one of the rims, bridge, legs, or nose pad.

In accordance with another embodiment, a control apparatus includes a first input port to receive at least a first strain signal; and a controller including the first input port, wherein the controller is to identify a user wearing a frame coupled to at least one strain gauge to output the first strain signal, the controller to identify the user wearing the frame based on deformation of the frame indicated by the at least the first strain signal, and wherein the controller is to control operation of an electronic device based on the user identification.

The control apparatus may include at least a second input port to receive at least a second strain signal, wherein the controller may include the second input port and wherein the first and second strain signals may be indicative of deformation at different locations of the frame, the first and second strain signals to form a deformation profile to identify the user wearing the frame.

The control apparatus may include a memory may store the deformation profile of the user, wherein the controller may identify the user wearing the frame based on a comparison of the deformation profile corresponding to the first and second strain signals and the deformation profile stored in the memory.

The controller may re-identify a wearer of the frame when a change in at least the first strain signal exceeds a predetermined value. The controller may limit operation of the electronic device when the user is not identified as an authorized user.

BRIEF DESCRIPTION OF THE DRAWINGS

Features will become apparent to those of skill in the art by describing in detail exemplary embodiments with reference to the attached drawings in which.

DETAILED DESCRIPTION

Example embodiments are described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

Figure 1:
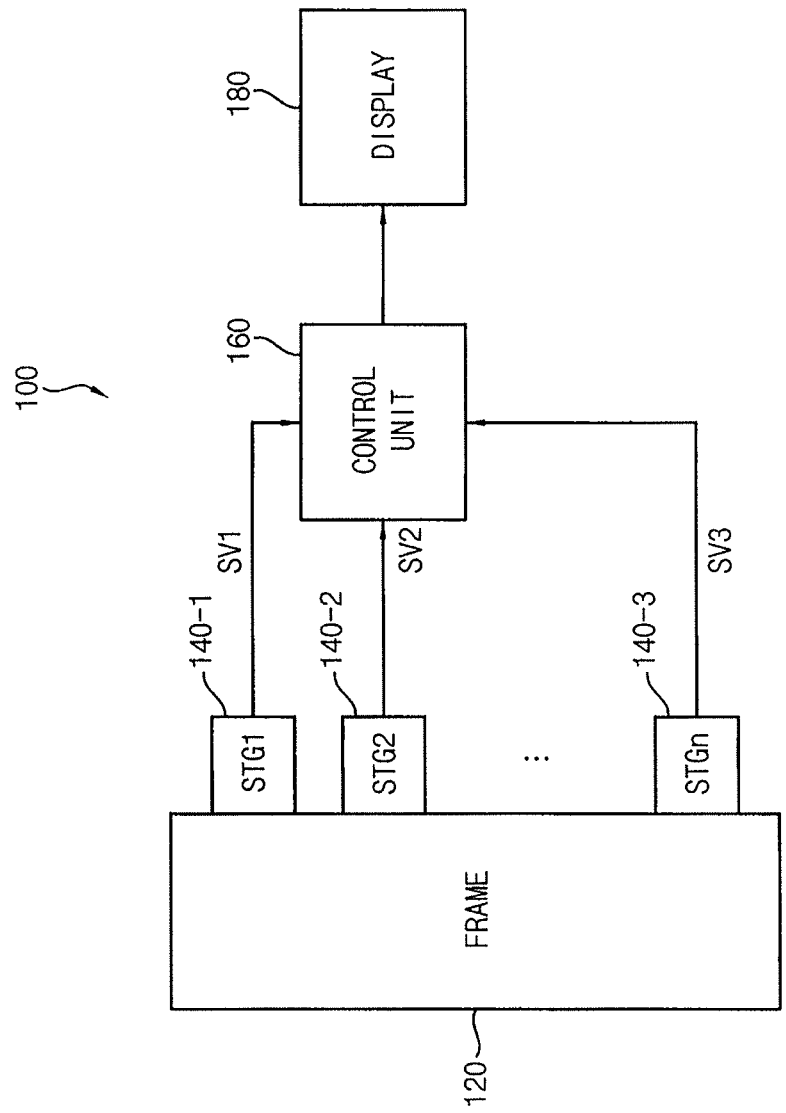
FIG. 1 illustrates an embodiment of an electronic device.

FIG. 1 illustrates an embodiment of an electronic device 100 which includes a frame 120, at least one strain gauge 140-1, 140-2, and 140-3, and a control unit 160. The electronic device 100 may also include a display device 180 or may be coupled to a display device.

The frame 120 may be configured to be worn by a user. For example, the frame 120 may have a suitable shape corresponding to a predetermined portion of a body, to allow the user to wear the electronic device 100. For example, the frame 200 may have a shape corresponding to the head of a user, e.g., the electronic device 100 may be a head mounted device (HMD) worn on the head of the user. In one embodiment, the frame 120 may be in the shape of glasses as described in greater detail below with reference to FIG. 5A.

In other embodiment, the frame 120 may have a shape of a helmet to be worn on the head of a user. The helmet may protect the head of the user from external impact. In another embodiment, the frame 120 may have a shape of a circlet. This shape allows frame 120 to be worn on the head of the user and may allow the electronic device 100 to have small volume and light weight. Further, a circlet shape may allow the electronic device 100 to have a good-looking appearance.

At least one strain gauge may be located at the frame 120. In FIG. 1, the three strain gauges 140-1, 140-2, and 140-3 generate the deformation measurement signals SV1, SV2, and SV3 representing amounts of strain caused by deformation at various locations of frame 120. At least one deformation measurement signal SV1, SV2, and SV3 may be provided to control unit 160. The control unit 160 determines overall deformation of the frame 120 based on the at least one deformation measurement signal SV1, SV2, and SV3.

In one embodiment, the electronic device 100 may include at least one strain gauge. In another embodiment, the electronic device 100 may include two or more strain gauges. In this case, control unit 160 may more accurately determine the deformation of the frame 120. In one embodiment, the three or more strain gauge 140-1, 140-2, and 140-3 may be included. The strain gauges in the aforementioned embodiments may be the same type of strain gauge or a combination of different gauges. Examples of strain gauges that may be used include a metal resistance strain gauge, a semiconductor strain gauge, and a capacitive strain gauge.

In one embodiment, the strain gauges 140-1, 140-2 and 140-3 may be formed on or attached to frame 120. In other embodiments, the strain gauges 140-1, 140-2 and 140-3 may be formed by a three-dimensional printer.

The control unit 160 may identify the user who wears the frame 120 based on the one or more of the deformation measurement signals SV1, SV2, and SV3 generated by the one or more strain gauge 140-1, 140-2, and 140-3. For example, in a case where the electronic device 100 is a head mounted device, because each user may have a unique shape of a skull, the deformation measurement signals SV1, SV2, and SV3 of the strain gauge 140-1, 140-2, and 140-3 may be unique to each user. Accordingly, the user who wears the frame 120 may be identified based on the unique deformation measurement signals SV1, SV2, and SV3. For example, the control unit 160 may identify a user who wears the frame 120 (or the electronic device 100) based on the unique deformation measurement signals SV1, SV2, and SV3 generated by the strain gauges 140-1, 140-2, and 140-3.

In one embodiment, the control unit 160 may start to identify the user who wears the frame 120 when an amount of change of one or more of the deformation measurement signals SV1, SV2, and SV3 is maintained below a first reference value during a predetermined time. For example, when the user starts to wear the frame 120, or while the user wears the frame 120, the deformation measurement signals SV1, SV2, and SV3 of the strain gauge 140-1, 140-2, and 140-3 may be continuously changed, and may not accurately represent the deformation of the frame 120 unique to the user. Thus, the control unit 160 may not accurately identify the user wearing frame 120.

However, in one embodiment, because the control unit 160 starts to identify the user when the amount of change of deformation measurement signals SV1, SV2, and SV3 is maintained below the first reference value during the predetermined time (e.g., after wearing the frame 120 is completed), the control unit 160 may accurately identify the user who is wearing the frame 120.

In one embodiment, after the control unit 160 identifies the user who is wearing the frame 120, the control unit 160 may re-identify the user wearing the frame 120 when the amount of change in one or more of the deformation measurement signals SV1, SV2, and SV3 exceeds a second reference value. For example, after a first user finishes using the electronic device 100, a second user different from the first user may wear the frame 120 for purposes of using the electronic device 100. In this case, the electronic device 100 may identify the second user who is a new user. While the first user takes off the frame 120 (or the electronic device 100), or while the second user is wearing the frame 120 (or electronic device 100), the amount of change in at least one of the deformation measurement signals SV1, SV2, and/or SV3 may be large.

In one embodiment, because the control unit 160 re-identifies the user who is wearing the frame 120 when the change amount of one or more of the deformation measurement signals SV1, SV2, and SV3 exceeds a second reference value, the control unit 160 may identify the new user when the user is wearing the frame 120, and may distinguish between a previous user and the new user.

In one embodiment, the user may deform the frame 120 in a predetermined deformation pattern. The strain gauge 140-1, 140-2, and 140-3 may generate the deformation measurement signals SV1, SV2, and SV3 indicating the predetermined deformation pattern. The control unit 160 may identify the user based on the predetermined deformation pattern indicated by the deformation measurement signals SV1, SV2, and SV3.

For example, when the frame 120 has a shape of glasses, the user may stretch legs of the glasses a predetermined number of times. The electronic device 100 may identify the user by recognizing the predetermined number of times of stretching. In one embodiment, different deformation patterns may be stored in the electronic device 100 for respective authorized users. The control unit 160 may identify the user by comparing a deformation pattern indicated by one or more of the deformation measurement signals SV1, SV2 and SV3 with the stored deformation patterns.

For example, the deformation pattern may correspond to the number of times of the deformation (e.g., stretching the legs of the glasses a predetermined number of times). In another example, the deformation pattern may correspond to the number of times of the deformation and a time interval between the deformation (e.g., stretching the legs of the glasses the predetermined number of times with a time interval of 1 second).

The display device 180 may display a result of the identification by the control unit 160. The display device 180 may display the identification result to the user who is wearing the frame 120. In one embodiment, the electronic device 100 may be a head mounted device, and the display device 180 may be located proximate to an eye of the user to allow the user to readily view an image displayed on the display device 180. In one embodiment, the display device 180 may be disposed on both eyes of the user, and respective display the devices 180 may display different images to provide a three-dimensional image.

Figure 2A:
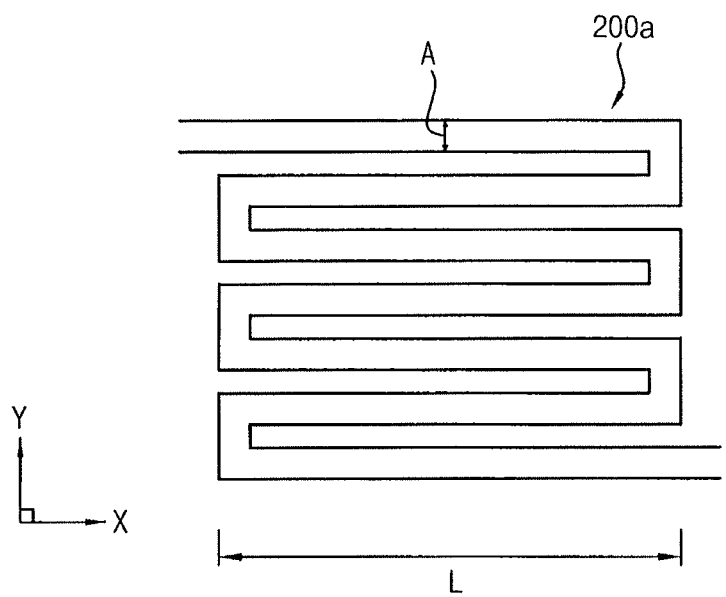
FIGS. 2A and 2B illustrate a strain gauge in different states.
Figure 2B:
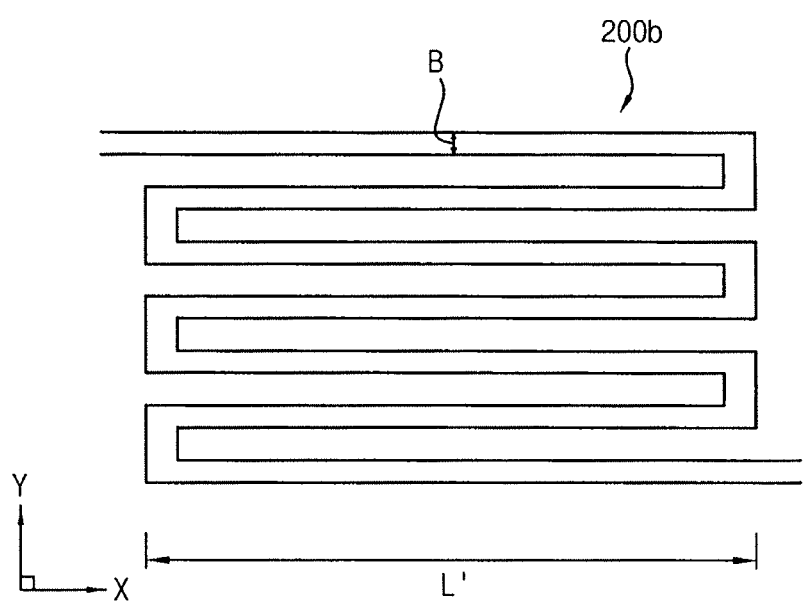

FIGS. 2A and 2B illustrate an example of a strain gauge that senses an amount of strain caused by deformation of a frame. In FIGS. 2A and 2B, a metal resistance strain gauge is illustrated as an example of the strain gauges 140-1, 140-2, and 140-3 located at the frame 120 in FIG. 1.

In particular, FIG. 2A illustrates a metal resistance strain gauge before the frame 120 of FIG. 1 is deformed, e.g., the strain gauge 200a in a non-deformed state. FIG. 2B illustrates the metal resistance strain gauge after the frame 120 is deformed, e.g., the strain gauge 200b in a deformed state. As illustrated in FIGS. 2A and 2B, deformation of the frame 120 may be sensed by this metal resistance strain gauge transitioning from non-deformed to deformed states.

The metal resistance strain gauge may include a wire or a thin film formed of a metal in a zigzag shape, where a length of the wire or thin film extending in an X direction in which a strain is sensed is longer than that of the wire or thin film extending in a Y direction perpendicular to the X direction. The metal wire or the metal thin film may be formed on or attached to the frame 120 illustrated in FIG. 1.

When a portion of the frame 120 of FIG. 1 is deformed (for example, extended in the X direction), strain may be applied to the metal resistance strain gauge on the portion of the frame 120 of FIG. 1. Further, due to ductility of metal, as illustrated in FIG. 2B, metal resistance strain gauge may be also deformed (for example, extended in the X direction in which the portion of the frame 120 of FIG. 1 is extended) by the applied strain.

As a result, a width B of the wire or the thin film of the deformed metal resistance strain gauge 200b may be smaller than a width A of the wire or the thin film of the original metal resistance strain gauge 200a. Further, a total length (L'*N, where N is the number of the wire or thin film extending in the X direction) of the deformed metal resistance strain gauge 200b may be increased by (L'−L)*N, compared with a total length (L*N) of the original metal resistance strain gauge 200a.

Because a resistance of a wire (or a thin film) is proportional to a length of the wire and is inversely proportional to a width of the wire, a resistance of the deformed metal resistance strain gauge 200b may be increased compared with that of the original metal resistance strain gauge 200a. Further, because the resistance of the metal resistance strain gauge 200a and 200b is increased depending on the applied strain, the applied strain may be measured by measuring the resistance of the metal resistance strain gauge 200a and 200b.

As described above, the resistance of the metal resistance strain gauge 200a and 200b may be measured. Thus, the strain applied to the metal resistance strain gauge 200a and 200b may be measured based on the measured resistance. Further, based on the measured strain, the deformation of the frame 120 of FIG. 1 may be measured.

Figure 3:
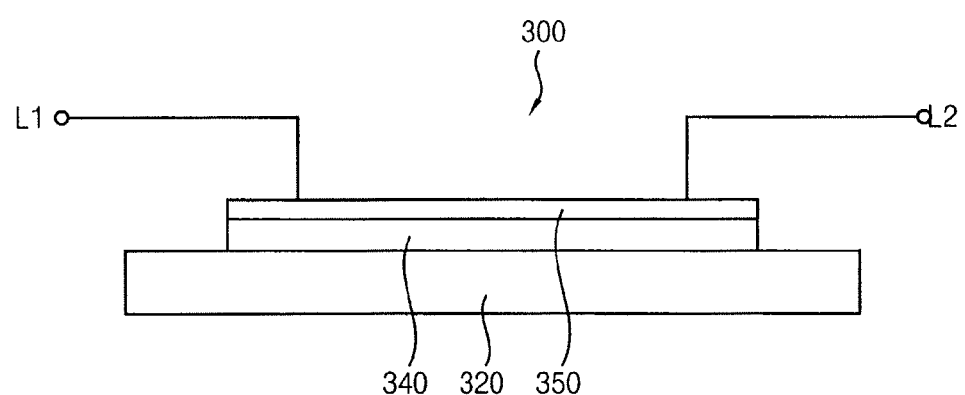
FIG. 3 illustrates another example of a strain gauge.

FIG. 3 illustrates another example of a strain gauge that senses an amount of strain caused by deformation of a frame. Referring to FIG. 3, a semiconductor strain gauge 300 may include a semiconductor layer 350 formed on a frame 320. In one embodiment, semiconductor strain gauge 300 may further include an adhesive layer 340 between frame 320 and semiconductor layer 350. The semiconductor layer 350 may be formed of single crystal silicon.

Lead wires L1 and L2 may be coupled to respective ends of the semiconductor layer 350. A resistance of semiconductor layer 350 may be measured based on a voltage between lead wires L1 and L2 and a current flowing through the lead wires L1 and L2. Due to a piezoresistive effect, the resistance of the semiconductor layer 350 may be changed depending on a strain (or a stress) applied to the semiconductor layer 350. Further, because deformation of the frame 320 may cause strain on the semiconductor layer 350, the deformation of the frame 320 may be measured by measuring the resistance of the semiconductor layer 350.

Figure 4A:
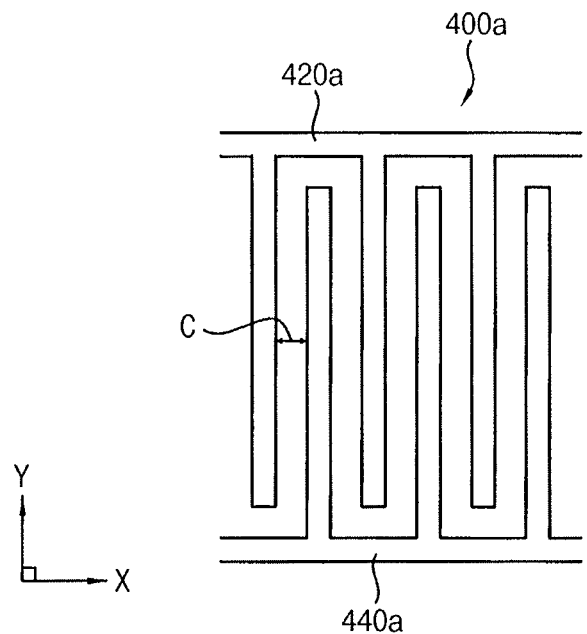
FIGS. 4A and 4B illustrate another strain gauge in different states.
Figure 4B:
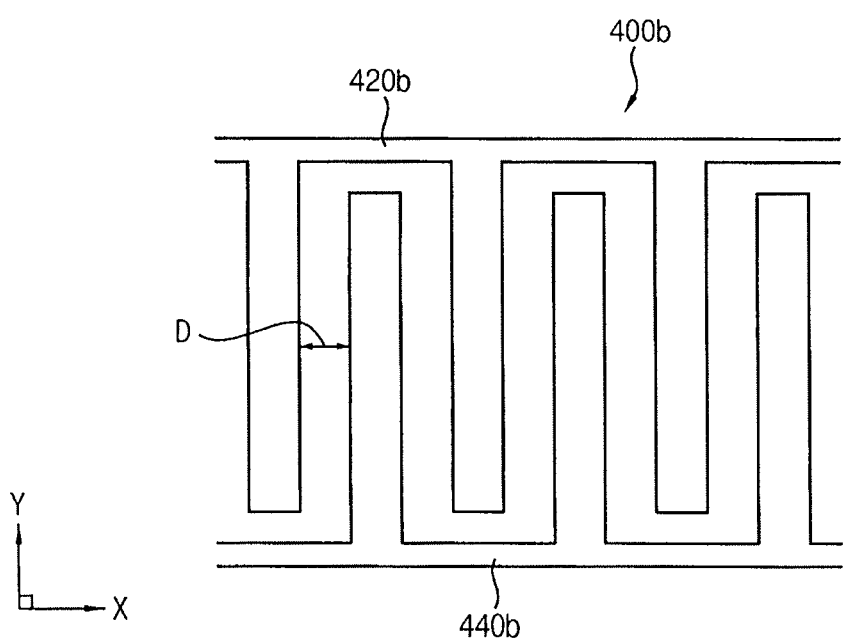

FIGS. 4A and 4B are diagrams illustrating another example of a strain gauge that senses an amount of strain caused by deformation of a frame. In FIGS. 4A and 4B, a capacitive strain gauge 400a and 400b is illustrated as an example of strain gauges 140-1, 140-2, and 140-3 located at frame 120 in FIG. 1.

In particular, FIG. 4A illustrates capacitive strain gauge before the frame 120 is deformed (e.g., in a non-deformed state 400a), and FIG. 4B illustrates the capacitive strain gauge after the frame 120 is deformed (e.g., in a deformed state 400b). As illustrated in FIGS. 4A and 4B, deformation of the frame 120 may be sensed by the capacitive strain gauge.

The capacitive strain gauge may include a first electrode (420a in the non-deformed state and 420b in the deformed state) in a comb shape on the frame 120 of FIG. 1. The capacitive strain gauge may also include a second electrode (440a in the non-deformed state and 440b in the deformed state) in the comb shape on the frame 120 of FIG. 1. The first electrode and second electrode may be disposed substantially symmetrically (for example, point-symmetrically) with each other.

The first electrode may include a plurality of metal wires or metal thin films in the form of the teeth of the comb, which extend in a Y direction perpendicular to an X direction in which a strain is sensed. The first electrode may serve as one electrode of a capacitor.

The second electrode may include a plurality of metal wires or metal thin films in the form of the teeth of the comb, which extend in the Y direction perpendicular to the X direction in which the strain is sensed. The metal wires or metal thin films of the second electrode are separated from the metal wires or metal thin films of the first electrode. The second electrode may serve as another electrode of the capacitor.

Before the frame 120 is deformed, the capacitive strain gauge 400a may not be deformed and the plurality of metal wires or metal thin films of the first electrode 420a may be spaced apart by a predetermined distance C from the plurality of metal wires or metal thin films of the second electrode 440a. Because the first electrode 420a and the second electrode 440a are spaced apart from each other, the first electrode 420a and the second electrode 440a may form the capacitor having a predetermined capacitance.

After the frame 120 is deformed, the capacitive strain gauge 400b may be deformed and the distance C between the metal wires or metal thin films of first electrode 420b and the metal wires or metal thin films of the second electrode 440b may be increased to a distance D, as illustrated in FIG. 4B. As a result, because the capacitance of a capacitor is inversely proportional to a distance between two electrodes of the capacitor, the capacitance between the first electrode 420a and 420b and the second electrode 440a and 440b may be changed according to the deformation of frame 120.

For example, when the frame 120 of FIG. 1 is extended in the X direction in which the strain is sensed, the distance C in FIG. 4A may be increased to the distance D. Because the capacitance between the first electrode 420a and 420b and the second electrode 440a and 440b is inversely proportional to distance C and D between the first and the second electrodes 420a, 420b, 440a and 440b, the capacitance between the first electrode 420a and 420b and the second electrode 440a and 440b may be decreased.

Figure 5A:
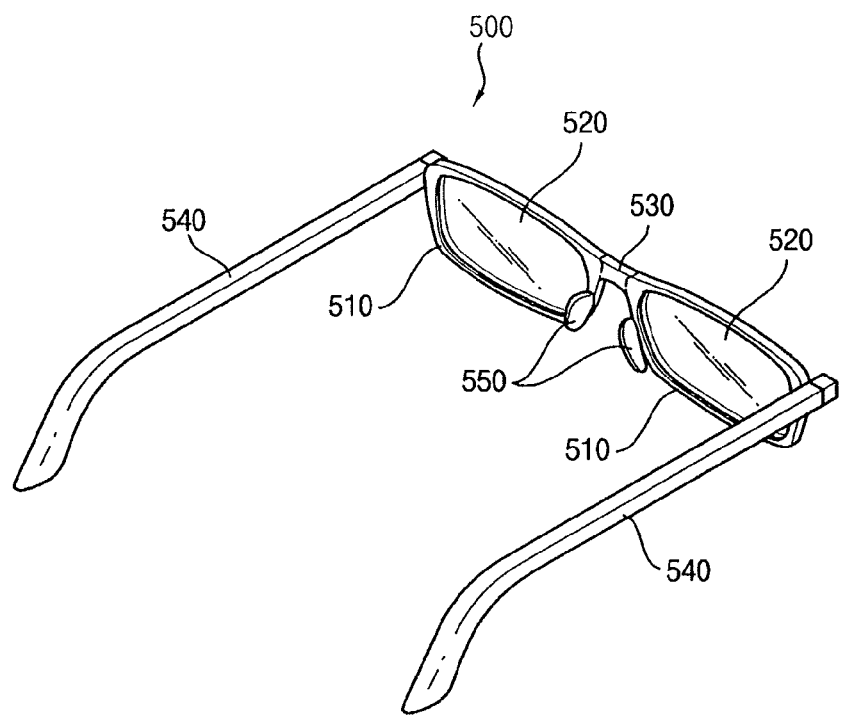
FIG. 5A illustrates an example of a frame of an electronic device.

FIG. 5A illustrates an example of a frame 500 of an electronic device, wherein the frame 500 is a pair of glasses. In one embodiment, the frame 500 may include two rims 510, two lenses 520, a bridge 530, two legs 540, and at least one nose pad 550.

The rims 510 hold the lenses 520. The lenses 520 may be formed of a transparent material. In one embodiment, the lenses 520 may block light having a particular wavelength. The bridge 530 connects the two rims 510. The two legs 540 are connected to the two rims 510, respectively. The two legs 540 may be parallel to each other, and may extend in a direction perpendicular to a direction of the bridge 530 connecting the rims 510. The nose pad 550 may support the rims 510.

According to one embodiment, at least one strain gauge 140-1, 140-2, and/or 140-3 in FIG. 1 may be located on at least one of rims 510, the lenses 520, the bridge 530, the legs 540, or the nose pad 550. As the number of the strain gauges disposed on frame 500 increases, deformation of frame 500 may be more accurately measured.

Figure 5B:
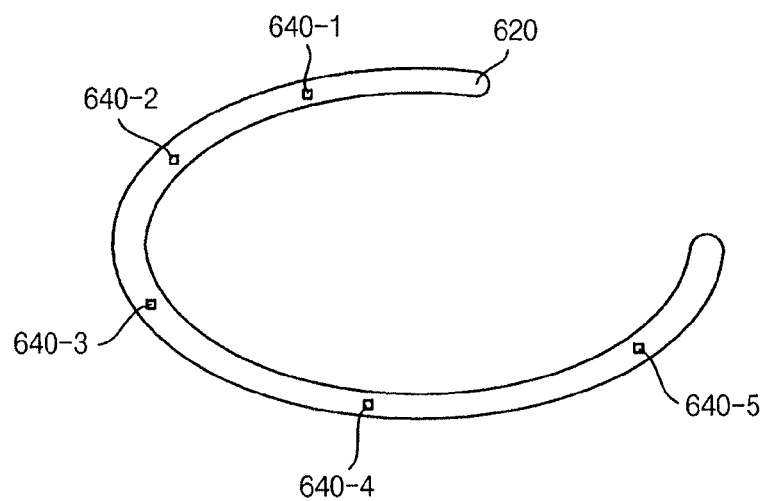
FIG. 5B illustrates another example of a frame of an electronic device.

FIG. 5B illustrates another example of a frame 620 of an electronic device. In this embodiment, frame 620 is in the shape of a circlet. At least one strain gauge 640-1, 640-2, 640-3, 640-4, and 640-5 may be located at the frame 620. A user who wears the frame 620 may be identified based on a deformation measurement signal generated by the at least one strain gauge 640-1, 640-2, 640-3, 640-4, and 640-5. As the number of the strain gauge 640-1, 640-2, 640-3, 640-4, and 640-5 disposed on the frame 620 increases, deformation of the frame 620 may be more accurately measured.

Figure 5C:
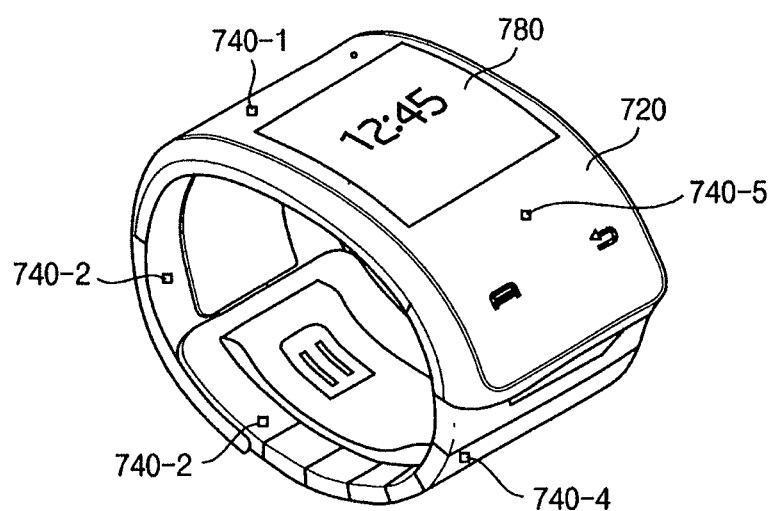
FIG. 5C illustrates another example of a frame of an electronic device.

FIG. 5C is a diagram illustrates another example of a frame 720 in the shape of a watch. At least one strain gauge 740-1, 740-2, 740-3, 740-4, and 740-5 may be located at the frame 720. A user who wears the frame 720 may be identified based on a deformation measurement signal generated by the at least one strain gauge 740-1, 740-2, 740-3, 740-4, and 740-5. As the number of the strain gauges 740-1, 740-2, 740-3, 740-4, and 740-5 on the frame 720 increases, deformation of the frame 720 may be more accurately measured. In one embodiment, the display device 780 may display a result of the identification of the user.

Figure 6:
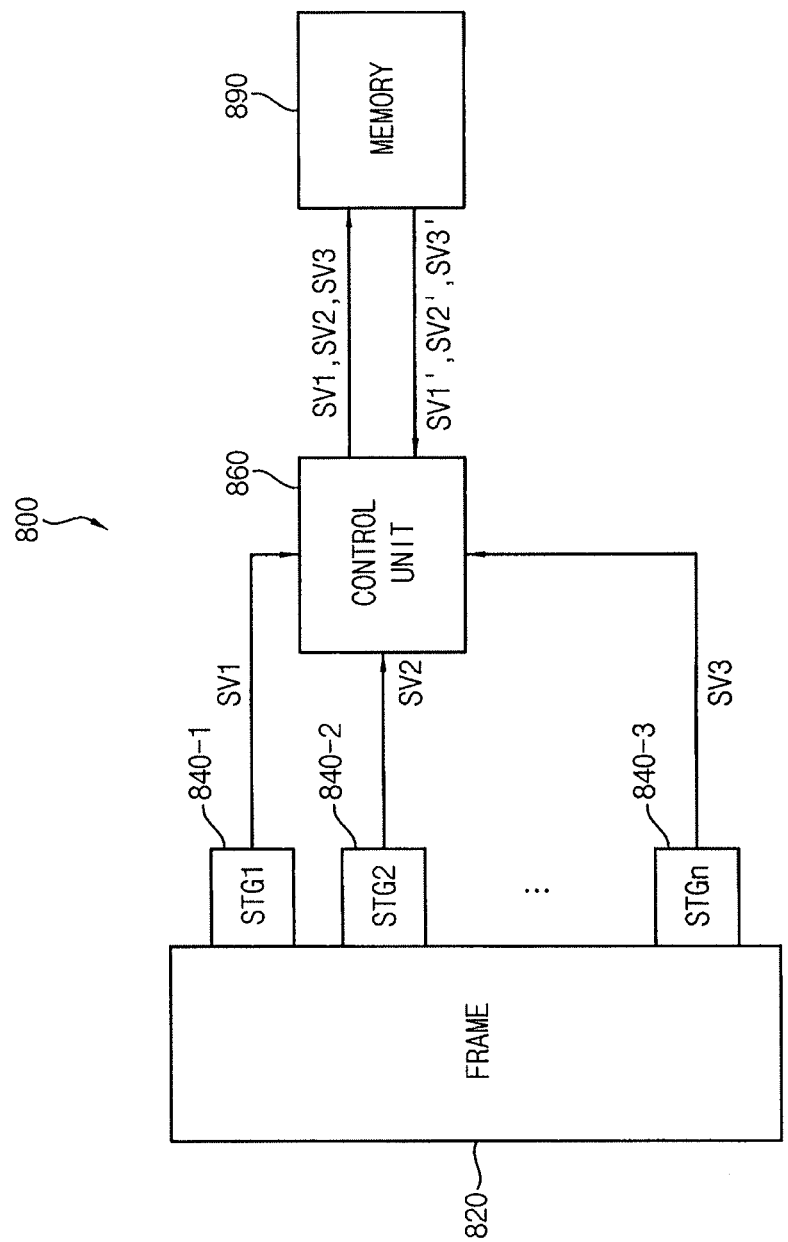
FIG. 6 illustrates another embodiment of operating an electronic device.

FIG. 6 illustrating an embodiment of an electronic device 800 which includes a frame 820, at least one strain gauge 840-1, 840-2, and 840-3, a control unit 860, and a memory 890. The frame 820 and at least one strain gauge 840-1, 840-2 and 840-3 may be the same as or similar to the frame 120 and the strain gauges 140-1, 140-2, and 140-3 in FIG. 1.

The memory 890 may store each value of a deformation measurement signal SV1, SV2, and SV3 of the strain gauges 840-1, 840-2, and 840-3 caused by deformation of frame 820 when at least one user wears the frame 820. In one embodiment, storing the value of deformation measurement signal SV1, SV2, and SV3 in the memory 890 may be performed in a setting mode. When a user wears the frame 820 after storing the values of the deformation measurement signals SV1, SV2, and SV3, the control unit 860 may identify the user by comparing the values of deformation measurement signals SV1, SV2, and SV3 currently generated by strain gauges 840-1, 840-2 and 840-3 with the value of deformation measurement signals SV1', SV2' and SV3' stored in memory 890.

For example, in a setting mode, strain gauges 840-1, 840-2, and 840-3 may generate deformation measurement signals SV1, SV2, and SV3 unique to each authorized user. The unique deformation measurement signals SV1, SV2, and SV3 may be stored in the memory 890 with respect to the authorized user. In normal operation mode after the setting mode, when the user wears the frame 820, the control unit 860 may compare the value of the currently generated deformation measurement signals SV1, SV2, and SV3 with the values of the stored deformation measurement signals SV1', SV2', and SV3'. Based on this comparison, a determination is made as to whether the current user is an authorized user.

Figure 7:
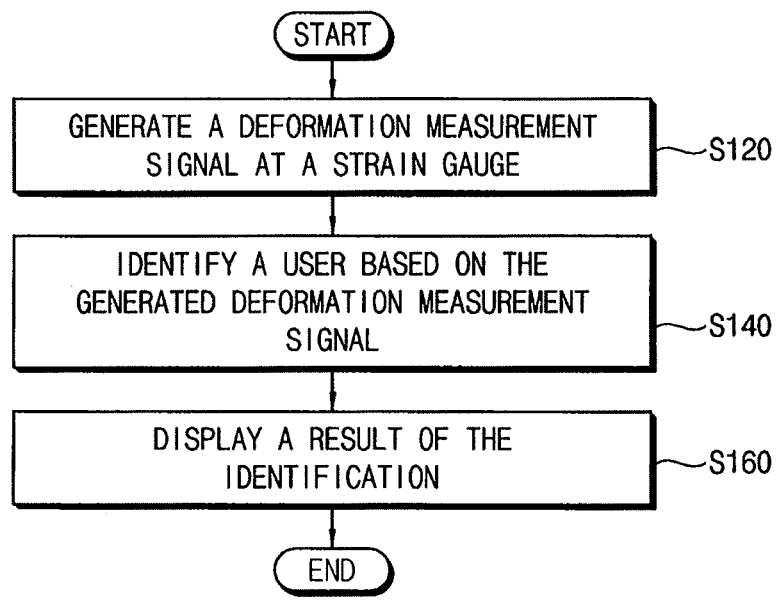
FIG. 7 illustrates an embodiment of operating an electronic device.

FIG. 7 illustrates an embodiment of a method of operating an electronic device, which includes a frame configured to be worn by a user. In this method, at least one strain gauge located at the frame generates a deformation measurement signal representing an amount of strain caused by deformation of the frame (S120). The user wearing the frame may be identified based on the deformation measurement signal (S140). A result of the identification of the user may be displayed (S160).

Referring to FIG. 7, the strain gauge at the frame generates the deformation measurement signal representing the amount of strain caused by deformation of the frame when the user wears the frame (S120). The amount of strain represented by the deformation measurement signal may correspond to an amount of the deformation of the frame.

At least one strain gauge may be formed on or attached to the frame. In one embodiment, the at least one strain gauge may be formed by a three-dimensional printer.

In one embodiment, two or more strain gauges may be located at the frame. The deformation of the frame may be more accurately measured based on deformation measurement signals generated by the two or more strain gauges. The strain gauge may be a metal resistance strain gauge, a semiconductor strain gauge, a capacitive strain gauge, or a combination thereof in a multiple strain gauge embodiment.

The user wearing the frame may be identified based on the deformation measurement signal(s) (S140). For example, in a case where the electronic device is a head mounted device, because each user has a unique skull shape, deformation measurement signal(s) of the strain gauge(s) may be unique to each user. Accordingly, the user wearing the frame (or electronic device) may be identified based on the unique deformation measurement signal(s).

In one embodiment, identifying the user wearing the frame may be initiated when one or more deformation measurement signal(s) change and that change is maintained below a first reference value during a predetermined time. For example, when a user starts to wear the frame, or while the user is wearing the frame, the deformation measurement signal(s) of the strain gauge(s) may continuously change, and may not accurately represent the deformation of the frame unique to the user. Thus, the user wearing the frame may not be accurately identified based on the continuously changing deformation measurement signal(s).

However, in one embodiment, because identifying the user may be initiated when the amount of change of the deformation measurement signal(s) is maintained below the first reference value during the predetermined time (for example, after wearing the frame is completed), the user wearing the frame may be accurately identified.

In one embodiment, after identifying the user wearing the frame, the user wearing the frame may be re-identified when the amount of change of one or more of the deformation measurement signals exceeds a second reference value. For example, after a first user completes using the electronic device, a second different user may wear the frame for purposes of using the electronic device. In this case, the electronic device may identify the second user who is a new user.

While the first user takes off the frame (or electronic device), or while the second user wears the frame (or electronic device), the amount of change in the deformation measurement signal(s) may be large. The user wearing the frame may be re-identified when the amount of change in the deformation measurement signal(s) exceeds a second reference value. Thus, the new user may be accurately identified when the new user wears the frame, and may be distinguished from the previous user.

In one embodiment, the user may deform the frame in a predetermined deformation pattern. Each strain gauge may generate the deformation measurement signal indicating the predetermined deformation pattern. The user may be identified based on the predetermined deformation pattern indicated by the deformation measurement signal. For example, in a case where the frame has a shape of glasses, the user may stretch legs of the glasses a predetermined number of times. The user may be identified by recognizing the predetermined number of times the legs are stretched.

In one embodiment, different deformation patterns may be stored in the electronic device with respect to respective authorized users. The user may be identified by comparing a deformation pattern indicated by the deformation measurement signal with the stored deformation patterns. For example, the deformation pattern may correspond to the number of times of the deformation (e.g., stretching the legs of the glasses the predetermined number of times). In other examples, the deformation pattern may correspond to the number of times of the deformation and a time interval between the deformation (e.g., stretching the legs of the glasses the predetermined number of times with a time interval of 1 second).

A result of the identification of the user may be displayed (S160). The identification result may be displayed to the user wearing the frame, to allow the user to see the identification result. In one embodiment, the electronic device may be a head mounted device, and the display device may be located proximate to an eye of the user to allow the user to readily see an image displayed on the display device. In one embodiment, the display device may be disposed on both eyes of the user, and respective display devices may display different images to provide a three-dimensional image.

Figure 8:
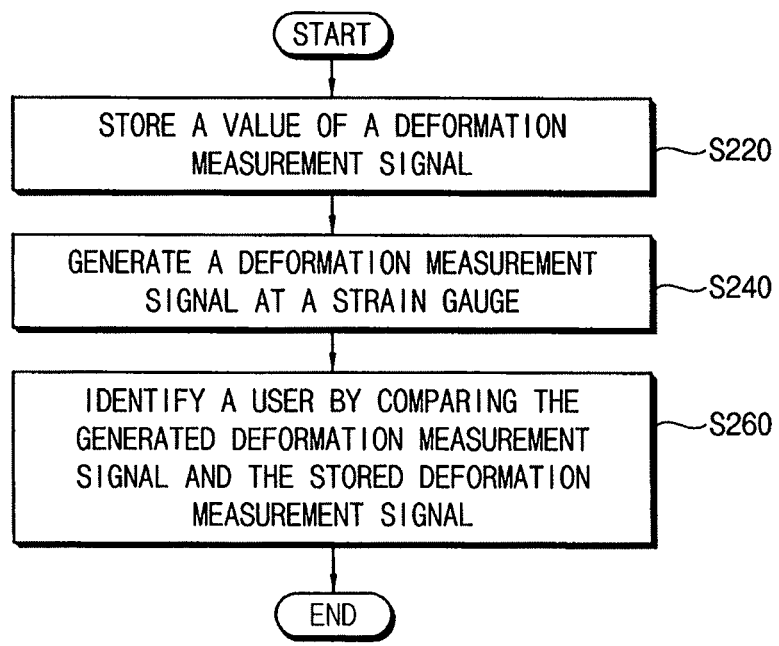
FIG. 8 illustrates another embodiment of operating an electronic device.

FIG. 8 illustrates another embodiment of a method of operating an electronic device, which includes a frame configured to be worn by a user. In the method of FIG. 8, a value of at least one deformation measurement signal corresponding to at least one authorized user is previously stored in memory (S220). When a user wears the frame, at least one strain gauge located at the frame generates a deformation measurement signal representing an amount of strain caused by deformation of the frame (S240). The user wearing the frame is identified by comparing a value of the deformation measurement signal currently generated by the strain gauge with the value of the previously stored deformation measurement signal (S260).

For example, respective values of deformation measurement signals caused by deformation of the frame may be stored for different users (S220). In one embodiment, the value of the deformation measurement signal may be stored in a memory included in the electronic device in a setting mode. When a user wears the frame in normal operation mode, the strain gauge may generate the deformation measurement signal (S240). The user wearing the frame may be identified by comparing a value of the currently generated deformation measurement signal with the value of the previously stored deformation measurement signal (S260).

Because each deformation measurement signal is unique to each authorized user, a current user may be accurately identified by comparing the currently generated deformation measurement signal with the previously stored deformation measurement signal.

Of course, deformation measurement signals from a plurality of gauges may be stored to form a distribution profile of strain values correspond to deformation unique to each user. Currently measured signals from the strain gauges may then be compared with the distribution profile stored in memory for each user, to identify the person who is currently wearing the frame.

The electronic device may be any electronic device including a frame configured to be worn by a user. For example, the electronic device may be a wearable computer, a wearable digital camera, a wearable video camcorder, a watch, a wearable smart phone, a wearable multimedia player, a wearable personal digital assistant, a wearable music player, or a wearable cellular phone, to name a few.

By way of summation and review, a smart device may be adapted to be worn by a person. However, security problems may arise, such as an invasion of privacy, when an unauthorized user wears the device.

In accordance with one or more of the aforementioned embodiments, to provide for secure access, a person wearing a smart device may be accurately identified before being allowed to use the device. If identification of an authorized user does no occur, a control circuit in the device may block access to and/or operation of the device until an authorized user is identified. For example, when the device has a head-mounted device, the head mounted device should be in a locked state to prevent the invasion of privacy.

In accordance with one or more of the aforementioned embodiments, a wearable electronic device and method are provided that can identify a wearer as a pre-requisite to allowing the device to be used.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. An electronic device, comprising:
a frame to be worn by a user;
at least one strain gauges coupled to the frame, the at least one strain gauges to generate a deformation measurement signal indicative of an amount of strain caused by deformation of the frame; and
a control unit to identify the user wearing the frame based on the deformation measurement signal,
wherein, when the frame is deformed in a predetermined deformation pattern having a predetermined number of times of deformation and a predetermined time interval between deformation, the at least one strain gauge is to generate the deformation measurement signal indicating the predetermined deformation pattern, and the control unit is to identify the user based on the predetermined deformation pattern indicated by the deformation measurement signal.

2. The electronic device as claimed in claim 1, wherein:
the frame is to be worn on a head of the user, and
the electronic device is a head-mounted device (HMD).

3. The electronic device as claimed in claim 1, further comprising:
a display device to display a result of the identification by the control unit.

4. The electronic device as claimed in claim 1, wherein:
the at least one strain gauge includes an electrode formed in substantially a zigzag shape on the frame, and
the at least one strain gauge is to generate the deformation measurement signal based on a change in resistance of the electrode caused by the deformation of the frame.

5. The electronic device as claimed in claim 1, wherein:
the at least one strain gauge has a semiconductor layer on the frame, and
the at least one strain gauge is to generate the deformation measurement signal based on a change in resistance of the semiconductor layer caused by the deformation of the frame.

6. The electronic device as claimed in claim 1, wherein the at least one strain gauge includes:
a first electrode in a comb shape on the frame; and
a second electrode in the comb shape on the frame,
wherein the first and second electrodes are substantially symmetrical with each other, and wherein the at least one strain gauge is to generate the deformation measurement signal based on a change in capacitance between the first and second electrodes caused by deformation of the frame.

7. The electronic device as claimed in claim 1, further comprising:
a memory to store at least one value of the deformation measurement signal corresponding to at least one authorized user in a setting mode, wherein the control unit is to identify the user wearing the frame by comparing a value of the deformation measurement signal currently generated by the at least one strain gauge with the value of the deformation measurement signal stored in the memory in an operation mode.

8. The electronic device as claimed in claim 1, wherein the control unit is to begin to identify the user wearing the frame when an amplitude of the deformation measurement signal is maintained below a first reference value for a predetermined time.

9. The electronic device as claimed in claim 1, wherein, after the control unit identifies the user wearing the frame, the control unit is to re-identify a wearer when an amplitude of the deformation measurement signal exceeds a second reference value.

10. The electronic device as claimed in claim 1, wherein the frame has a shape of glasses.

11. The electronic device as claimed in claim 10, wherein the frame includes:
two rims;
two lenses fixed to respective ones of the rims;
a bridge to connect the rims;
two legs connected to respective ones of the rims; and
a nose pad to support the rims, wherein the at least one strain gauge is located on at least one of the rims, bridge, legs, or nose pad.

12. A method of operating an electronic device including a wearable frame, the method comprising:
receiving at least one deformation measurement signal from at least one strain gauges located at the frame, the at least one deformation measurement signal indicative of an amount of strain caused by deformation of the frame; and
identifying a user wearing the frame based on the deformation measurement signal, wherein, when the frame is deformed in a predetermined deformation pattern having a predetermined number of times of deformation and a predetermined time interval between deformation, the at least one strain gauge is to generate the deformation measurement signal indicating the predetermined deformation pattern, and the user is identified based on the predetermined deformation pattern indicated by the deformation measurement signal.

13. The method as claimed in claim 12, further comprising:
displaying a result of the identification of the user.

14. The method as claimed in claim 12, further comprising:
storing at least one value of the deformation measurement signal corresponding to at least one authorized user in a setting mode, wherein identifying the user includes:
comparing a value of the deformation measurement signal currently generated by the at least one strain gauge with the at least one value of the deformation measurement signal stored in a memory in an operation mode.

15. A control apparatus, comprising:
a first input port to receive a first strain signal;
a second input port to receive a second strain signal; and
a controller including the first and second input ports, wherein the controller is to receive the first and second strain signals through the first and second input ports, respectively and to identify a user wearing a frame coupled to first and second strain gauges to output the first and second strain signals, respectively, the controller to identify the user wearing the frame based on the first and second strain signals caused by deformation of the frame, and wherein the controller is to control operation of an electronic device based on the user identification,
wherein, when the frame is deformed in a predetermined deformation pattern having a predetermined number of times of deformation and a predetermined time interval between deformation, the first and second strain gauges are to generate the first and second strain signals indicating the predetermined deformation pattern, and the controller is to identify the user based on the predetermined deformation pattern indicated by the first and second strain signals.

16. The control apparatus as claimed in claim 15,
wherein the first and second strain signals are indicative of deformation at different locations of the frame, the first and second strain signals to form a deformation profile to identify the user wearing the frame.

17. The control apparatus as claimed in claim 16, further comprising:
a memory to store the deformation profile of the user,
wherein the controller is to identify the user wearing the frame based on a comparison of the deformation profile corresponding to the first and second strain signals and the deformation profile stored in the memory.

18. The control apparatus as claimed in claim 15, wherein the controller is to re-identify a wearer of the frame when an amplitude of the first strain signal exceeds a predetermined value.

19. The control apparatus as claimed in claim 15, wherein the controller limits operation of the electronic device when the user is not identified as an authorized user.

* * * * *